Figure 1:
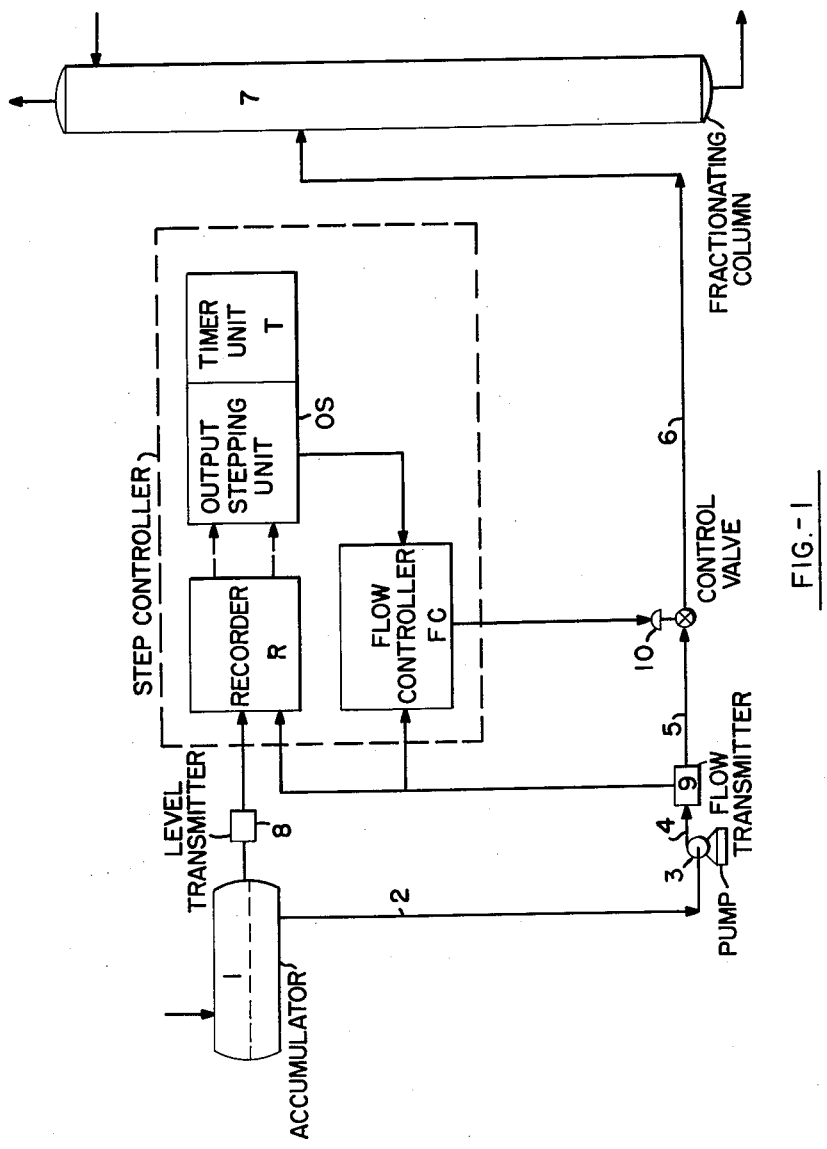

Dec. 11, 1962 J. R. CONNELL 3,067,766
AUTOMATIC PROCESS CONTROLLER WHOSE OUTPUT
IS CHANGED IN STEP FASHION
Filed June 21, 1960 2 Sheets-Sheet 1

John Robert Connell   Inventor

By *W. O. T Heilman*

Patent Attorney

John Robert Connell   Inventor

By

Patent Attorney

United States Patent Office 3,067,766
Patented Dec. 11, 1962

3,067,766
AUTOMATIC PROCESS CONTROLLER WHOSE OUTPUT IS CHANGED IN STEP FASHION
John Robert Connell, Sarnia, Ontario, Canada, assignor to Esso Research and Engineering Company, a corporation of Delaware
Filed June 21, 1960, Ser. No. 37,682
2 Claims. (Cl. 137—386)

The present invention relates to a type of automatic process control in which an automatic controller arrangement maintains constant or relatively constant the rate of flow of a fluid passing through an adjustable flow regulator, e.g. a control valve, assuming that the value of the flow rate or other process variable which it is controlling is within a band of values which are considered to be safe and operable. If the value of the process variable deviates outside of an acceptable band of values, the invention contemplates an automatic controller system which alters the variable, e.g. the rate of flow of the fluid passing through its control valve in an abrupt or "step" fashion, by a predetermined amount, to a new but still controlled rate. Where the process variable is a fluid flow rate, the fluid which is passing through a control mechanism such as a variable orifice is utilized to initiate an adjustment. Hence a fluid whose rate of flow is regulated by the degree of opening of a control valve, for example, will be referred to, hereinafter, as the "control agent."

The invention contemplates automatic alteration of an existing condition, e.g. a fluid rate of flow, to a new condition or rate of flow where the control agent is maintained in a newly adjusted but steady condition for a prescribed interval of time, to determine whether the change in the rate of flow of control agent has been effective in causing the process variable to migrate back into an acceptable range or band of values. If the change is effective, the automatic controller continues to control the flow of control agent at the new rate for a longer period. However, if the first change is not effective, within a prescribed interval of time, the automatic controller system is designed to make a second abrupt or "step" change in the rate of flow of control agent, the step being of the same or substantially uniform predetermined size as the first, as soon as the interval of waiting has elapsed. The automatic controller of this invention is designed in fact to continue to make these changes in the rate of flow of the control agent, each change being followed by the prescribed waiting interval, until the cumulative effect of these changes is to cause the process variable to migrate back into the acceptable band of values. Since the action of the automatic controller is such that it makes its changes in rate of flow of control agent in abrupt, or "step," fashion, this automatic controller may be called a Step Controller.

An important feature of novelty of the Step Controller is one which enables it to hold constant the rate of flow of the control agent, rather than the ultimately controlled process variable. In certain cases, this is advatageous from an overall process plant point of view, as will be explained later. As long as the value of a general process variable over which it exercises control is within the acceptable band of values, the Step Controller allows the general process variable such as temperature, pressure, liquid level in a reactor or reservoir vessel, etc., to wander, subject only to general variations in process plant conditions, and makes no change in rate of flow of control agent which would force an increase or decrease in the value of the process variable.

Background

A conventional automatic controller of the type now used in continuous processing plants, is generally installed to maintain a continuing process variable such as liquid level, pressure, rate of flow, or temperature, as closely as possible to some desired value. This desired value is called the set point of the automatic controller. To maintain the process variable at the set point, a typical controller of the prior art operates a control valve by means of a pneumatic or electric signal. The control valve regulates or attempts to regulate continuously the rate of flow of a gas or liquid control agent, which rate of flow has a direct influence on the value of the process variable.

Automatic controllers now in use are constantly striving to hold the process variable right on the set point. That is to say, as soon as the value of the process variable has changed the smallest detectable amount from the set point value, the controller will move the control valve in an attempt to bring it back again. This means, in effect, that the automatic controller is completely unconcerned with the variations which it makes in the rate of flow of a control agent. Its aim is to hold the process variable at the set point.

In many automatic process control applications frequent and continual movements of the control valve do not cause any problem other than wear on the valve mechanism and related parts. There are, however, certain applications in which it is not at all essential for the process variable to be held precisely and continuously at the set point. It is frequently better, from the point of view of the overall performance of the plant, to allow the process variable to drift off the set point slightly, rather than have the controller continually making changes in control valve setting, and consequently, changing the rate of flow of the control agent.

The situation in a petroleum refinery where a liquid is accumulated in a drum, or in the bottom of a tower, and then is fed to a fractionating column is a case in point. Here it is desirable to set the liquid feed rate to the fractionating column, so that the level of the accumulated liquid in the vessel from which the feed is being drawn does not rise or fall beyond certain safe limits. The automatic level controller which does this job, however, need not and preferably should not be continuously moving the control valve in order to maintain the liquid level at a precise set point. Continuous fluctuations in flow of control agent, which in this case is the feed to the succeeding fractionating column, will upset the operation of the column.

If such a system were set up with a flow controller on the fractionating column feed stream, and a liquid level recorder on the surge vessel, then a human operator of the plant would set the feed flow rate out of the surge vessel at a value which corresponded, as closely as he could set it, to the rate at which the liquid material was flowing into the vessel. He would not likely alter this feed flow rate as long as the level in the surge vessel stayed within the limits which he knew to be safe. If the level recorder told him that the liquid level was beginning to build up in the surge vessel, he would set the fractionating column feed flow rate at a higher value, and watch to see whether the increased outflow rate from the surge vessel would be sufficient to bring the level down again. Any further changes which he subsequently found it necessary to make would be made in the same step fashion.

The skilled human operator would not be continuously changing the column feed flow rate, but would be making changes in step fashion, and then only when it was necessary to do so. This type of operation is much more desirable than continuous adjustment from the point of view of the stable performance of the fractionating column. Its disadvantage lies in the fact that a considerable amount of operator attention may be required. In other words, it is considerably less automatic than direct level control.

The automatic controller which is comprised in the present invention follows essentially the same method of operation as the human plant operator. The rate of flow of a control agent is held constant by the Step Controller so long as the value of the process variable, in this example the level of liquid in an accumulator, is within the band of acceptable values. The unsafe or low limit and high limit values of the process variable are set on the Step Controller. If the value of the process variable drifts beyond the preset high or low limit, then the Step Controller makes a step change in its output, the rate of flow of control agent assumes a new steady value, and the controller waits for a definite interval of time to see if the change which it has made causes the process variable to come back into the acceptable operating band. If the first step change has not produced the required result by the time the interval has elapsed, the controller makes another step change in output of the same size as before.

Adjustments on the controller permit the size of the output change, and also the duration of the waiting interval, to be adjusted to suit the particular application. The controller is recording—it carries a record of the process variable, and a second record of the rate of flow of the control agent.

Another application on which the Step Controller proves useful is one in which there is a very long delay between the time when the automatic controller moves the control valve, and the time when the effect of the control valve movement is actually sensed by the measuring system of the controller. An automatic control system combined with a continuous stream analyzer which requires a sampling system, is an example of this type of application. It is frequently quite possible that a matter of some minutes may elapse before the effect of a change in control valve setting is actually measured by the continuous analyzer. Conventional automatic control under these circumstances is never capable of anything but mediocre results. If an automatic controller is applied, it will usually be found that the automatic system must be bypassed, and that manual operation must be resorted to.

The Step Controller of this invention is capable of fully automatic operation in this case. The interval which elapses between successive changes in Step Controller output is set slightly longer than the length of time required for the effect of a control valve movement to pass through the process and be measured by the continuous analyzer. Thus, the Step Controller will not take any corrective action, until it has determined how much of an effect has been produced by its previous change.

Figure 2:
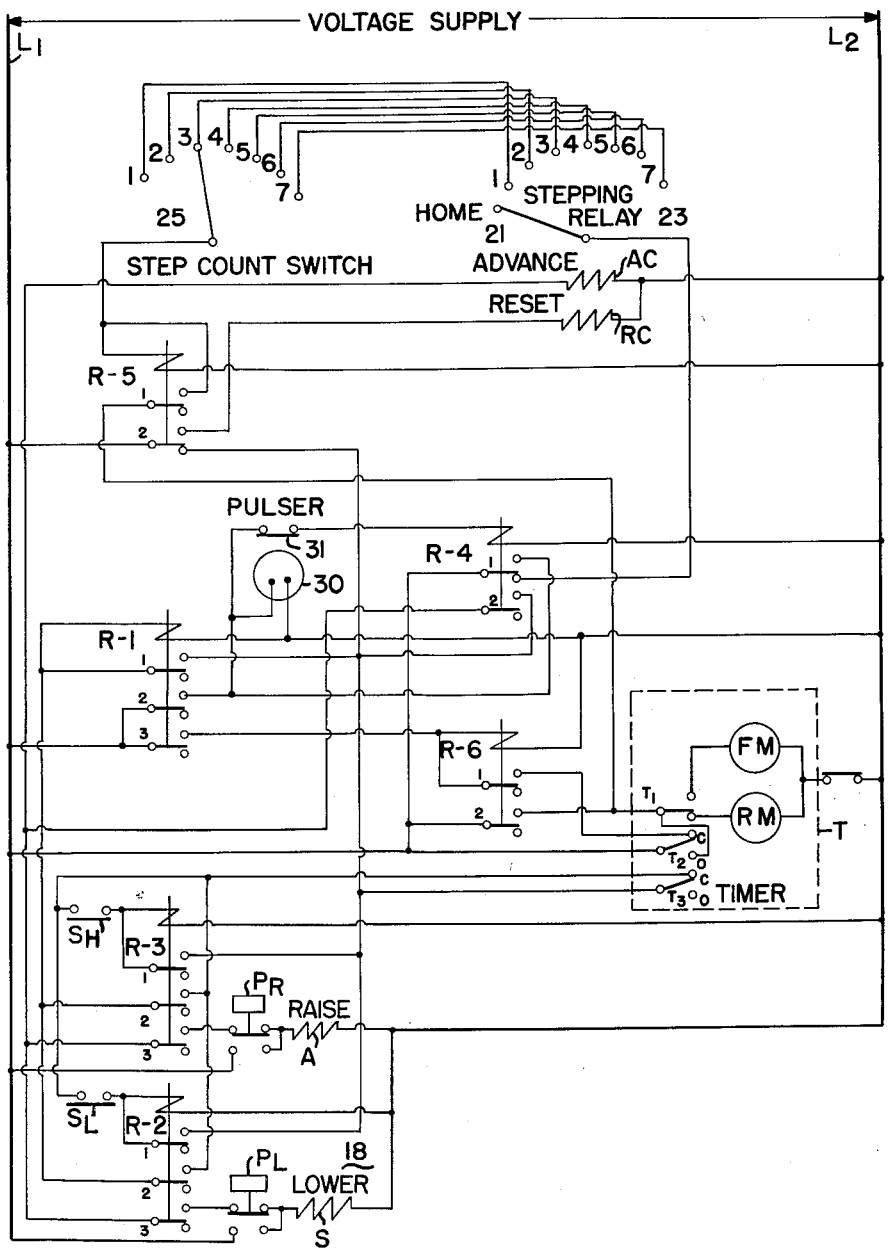

Referring now to the drawings, FIGURE 1 shows a Step Controller, made according to the present invention, as applied to a liquid level control problem. FIGURE 2 shows a circuit diagram.

In the illustrated case a liquid feed is pumped by a pump 3 FIGURE 1, from an accumulator 1 to a fractionating column 7, by way of the pipelines 2, 4, 5, and 6. The liquid level in the accumulator 1 is measured by a liquid level transmitter 8, which sends a pneumatic or electric signal, (whichever has been selected), proportional to the liquid level, to the recorder section R of the Step Controller. High limit and low limit switches $S_H$ and $S_L$ are provided in the liquid level recorder, which instigate the step control action, and these will be operated, at their preset values, by a level recording mechanism which is incorporated in the recorder unit R, FIGURE 1.

The liquid feed flow rate to the fractionating column is measured by a rate of flow transmitter 9, which measures the flow rate continuously, and sends a pneumatic or electric signal, (whichever has been selected), to the recorder unit R of the Step Controller. The recorder unit R consequently has two recording devices, e.g. two pens, one recording accumulator liquid level, and the other recording fractionating column feed flow rate.

The feed flow rate signal emitted by the flow transmitter 9 is also sent to a flow controller unit FC of the Step Controller. The flow controller FC compares the signal from the rate of flow transmitter 9, with the set point signal which it receives from an output stepping unit OS of the Step Controller, and positions the control valve 10 so that the actual flow is equal to this set point. The particular set point is actually the rate of flow which has been determined by the Step Controller to be correct for holding the accumulator level within the band of acceptable values. As will further be described below, the actual set point signal is developed over a period of time by the output stepping unit, which raises or lowers the set point signal, in step fashion, each time either the low limit or the high limit switch in the recorder is closed due to a low or high level in the accumulator. The electrical connections between the low limit and the high limit switches in the recorder, and the output stepping unit, are not represented in FIGURE 1 individually but are indicated generally by the dashed lines between these two units.

The sequence of events, for one cycle, can be summarized as follows. Variations in liquid level in the accumulator are measured by the liquid level transmitter 8 and passed on to the level recorder R. If the liquid level goes too low, or too high, either the low limit or the high limit switch (see FIGURE 2) will close and actuate the output stepping unit. The output stepping unit will make a step change, in the correct direction, in the set point signal to the flow controller. The flow controller accepts the new set point signal, and re-positions the control valve until the rate of flow of fractionating column feed is the same as the new set point. A timer unit T is started at the same time as the stepping unit is actuated. After the output stepping operation is completed, it cannot be repeated until the timer T has timed out the interval for which it has been set, even though the unsatisfactory level condition in the accumulator persists. This is explained more fully below.

*Component Parts*

Certain of the component parts of the Step Controller have already been partially described. Some additional details of these components will now be provided in the interests of clarity.

For satisfactory operation of the Step Controller, the rate of flow signal which is transmitted to the flow recorder and to the flow controller must vary linearly with rate of flow. This means that the rate of flow measurement of the control agent must be made by a linear meter, or, if it is made with a meter which functions on a square basis, a device which will extract the square root of the signal emitted by the flow transmitter must be installed in the transmission line between the transmitter, and the flow controller and flow recorder.

The recorder unit has two pens as noted above, one for recording the value of the process variable, the other for recording the rate of flow of the control agent. The recording mechanism for the process variable operates two individual switches, a low limit switch $S_L$ and a high limit switch $S_H$, FIG. 2. The actual operating points for these switches are adjustable, so that they can be made appropriate for the particular process, and process variable, which are involved. Settings of 30 percent of the measuring range for the low limit switch, and 70 percent for the high limit switch, might be representative where the controlled process variable is a liquid level.

The key component of the output stepping unit is the Add-Subtract relay indicated at 18 in FIGURE 2. This relay has two solenoids A and S, both of which will rotate a main shaft (not shown) one increment through a conventional ratchet and pawl mechanism, each time one of the solenoids is energized. The "Add" solenoid rotates the shaft in one direction, while the "Subtract"

solenoid rotates the shaft in the opposite direction. Consequently, an increment of rotation produced by energizing one solenoid, can be nullified by subsequently energizing the other solenoid. Owing to the fact that this electro-mechanical arrangement is used, in the Step Controller, to raise or lower the controller output signal in step fashion, the solenoids will hereafter be called the "Raise" and "Lower" solenoids, rather than the "Add" and "Subtract" solenoids.

Each time one of the solenoids A or S is energized, the main shaft of the Add-Subtract relay is caused to rotate a small increment (of the order of 6°), in the appropriate direction. This rotary motion of the shaft is converted into a suitable output signal, either pneumatic or electric, for transmitting as the set point signal of the flow controller. The details of the particular device which effects this conversion from angular rotation to a pneumatic or electric output signal are not important to the explanation of the Step Controller, since a number of such devices are already commercially available. In the pneumatic case, a practical arrangement has the converter device make a change in set point signal of 0.2 p.s.i. each time one of the solenoids in the Add-Subtract relay is energized.

Although a change in set point signal is normally produced by automatic action resulting from the closing of one of the two limit switches, it will be necessary, on occasion, to increase or decrease the set point signal independent of the automatic action. To do this, the output stepping unit is provided with two manual push buttons. One push button is electrically connected to the Raise solenoid, while the other is connected to the Lower solenoid. Consequently, by pushing the appropriate button, the solenoid connected to that button will be energized, and the set point signal will be increased or decreased one increment. By pushing the correct button the required number of times a step change in the flow controller set point signal of any size can be produced.

The output stepping unit also contains a rotary step count switch 25 consisting of a single rotating contact and several fixed contacts, and a stepping relay 23. It is through the combined action of the step count switch and the stepping relay that the Step Controller derives the ability to count incrementn (in terms of the number of times in succession the Raise or the Lower solenoid is energized), and assure that the correct number of increments go to make up the overall step change in set point signal.

For example, in the pneumatic Step Controller, each increment (produced by energizing either the Raise or the Lower solenoid one time), would produce a change in the flow controller set point signal of 0.2 p.s.i. If the particular process concerned was such that step changes in the set point signal of 0.6 p.s.i. should be made, then the step count switch 25 would be set at position 3. When a step change is called for, the appropriate solenoid will be energized exactly three times, thus producing three increments of change in set point signal. Each increment is equivalent to 0.2 p.s.i., so that the overall step change in set point signal will be the required 0.6 p.s.i. A detailed explanation of how the counting operation is brought about is included in a following section which describes the operation of the complete electrical system.

Another principal component is the timer unit T, which operates in conjunction with the output stepping unit, but which is not exactly a part of it. The timer T, FIGURE 2, is a commercially available type which has two motors FM and RM, so that the rotating mechanism which operates the timer switches can be driven in either direction. The instantaneous position of the rotating mechanism is shown by a moving pointer and a fixed scale which are not indicated in the drawing but whose structure is obvious. The zero, or start position, is at 6 o'clock position on the scale. The distance which the timer drives upscale from the zero position on either the right or left side of zero, before it reverses and drives downscale again, is adjustable. The driving interval is directly proportional to this distance along the scale. On the right side of zero, the setting is made at the minimum possible value, which would be equivalent to an interval of the order of 1 or 2 seconds. The corresponding interval setting on the left side of zero determines the time interval between successive step changes in output, and is dictated by the characteristics of the process.

The timer motor switch $T_1$, which switches the drive from the forward motor to the reverse motor and back again, is operated when the timer has driven upscale, on either side of zero, to the setting of the interval pointer on that side. The timer motor switch $T_1$ then reverses to cause the timer to drive back downscale. The timer load switches, of which there must be two, are operated as the timer drives past the zero point from either side.

*Function of the Various Electrical Components*

The electrical circuitry for the Step Controller is shown in FIGURE 2. The function of the various electrical components is as follows.

The stepping relay 23 and the Step Count switch 25 which are shown at the top of the schematic drawing, control the number of impulses which are sent to the Add-Subtract relay when corrective action is required. Since each pulse going to the Add-Subtract relay represents a change in Step Controller output of a fixed amount, the number of pulses, which is adjustable, will determine the overall controller output change.

The pulser unit simply acts as a motor driven push button.

The two coils A and S of the Add-Subtract relay are shown at the bottom of the schematic drawing. These coils are marked "Raise" and "Lower." It is through the action of the Add-Subtract relay, which takes place as a result of energizing one or other of these coils, that the level of the output signal of the Step Controller is established.

The two manual push buttons $P_R$ and $P_L$ shown at the bottom of the schematic drawing can be used to vary the output signal upward or downward independent of the automatic action of the Step Controller.

The timer switch which is marked $T_3$ is the switch which controls the interval between successive corrective changes in output signal from the Step Controller, assuming these corrective changes are required due to the fact that the controlled variable is outside of its preset limits.

Relay R–1 will be energized when the timer switch $T_3$ is on its C contact and when either the Low limit switch $S_L$ or the High limit switch $S_H$ is also closed. The No. 1 contacts of relay R–1 hold R–1 in until the output changing operation has been carried out to completion. The No. 2 contacts provide power to the pulser unit 30. The No. 3 contacts are used to energize relay R–6.

Relays R–2 and R–3 are operated by the Low limit and High limit switches $S_L$ and $S_H$ respectively in the recorder unit. The No. 1 contacts of each of these relays are used to hold in the relay after energization to assure that the Step Controller completes the operation of changing to the new output signal level. This is necessary since in many cases the limit switch in the recorder, which actually energizes the relay, will not remain closed long enough for the entire operation to be performed. The No. 2 contacts of both R–2 and R–3 are in series with the timer $T_3$ switch, thus providing an electrical path to energize relay R–1. The No. 3 contacts of each of these relays are used to assure that the electrical pulse or pulses are fed to the correct coil of the Add-Subtract relay.

Relay R–4 is operated by the pulser unit 30, and its contacts open and close as the pulser unit opens and closes its switch 31. Electrical pulses are fed to the appropriate coil of the Add-Subtract relay and also to the Advance coil AC of the stepping relay 23, through the No. 2 contacts of R-4. The No. 1 contacts of R-4 are used to prevent the pulser unit from stopping with its switch contacts in the closed position. This assures that the number of pulses will always be the same as the number corresponding to the setting of the Step Count switch.

Relay R-5 is energized when the correct number of pulses, as determined by the stepping relay and the setting of the Step Count switch, have been sent to the appropriate coil of the Add-Subtract relay. When relay R-5 is energized, current flows through its No. 2 contacts to the Reset coil RC of the stepping relay, causing the moving contact of the stepping relay to drop back to its home position. The No. 1 contacts are used to hold relay R-5 in, until such time as the timer has run out to its start position.

Relay R-6 has been included to assure that power is supplied to the timer T until the timer has begun the "interval" phase of the operation, and timer switch $T_2$ is in the O position. This would normally occur 1 to 2 seconds after the operation starts, depending on the characteristics of the timer. If the timer power were supplied directly from the No. 3 contacts of R-1, then it would be possible, with a setting of 1 or 2 on the Step Count switch, for the required pulses to be made and R-1 to be de-energized again, before the timer was into the "interval" phase of the operation and receiving power via its own No. 2 switch. With R-6 in the circuit, the timer continues to get power even though R-1 may be de-energized before the timer gets to the "interval" stage.

*Operation of the Electrical System*

At the beginning of the cycle, the timer switch $T_3$ will be in theC position, and the Low limit and High limit switches will both be open. No current will be flowing in any part of the system. The Step Count switch 25, which is used in conjunction with the stepping relay, will be set at one of the available positions. Assume that it has been set at its third position, as shown in FIGURE 2. This will mean that if a change in controller output is required, three electrical pulses will be sent to the appropriate coil of the Add-Subtract relay, to produce the desired change in controller output, in step fashion.

If it is desired to increase or decrease the controller output signal independent of the automatic action, it is possible to send a pulse or pulses to either the Raise or the Lower coil of the Add-Subtract relay by pressing the push button $P_R$ or $P_L$ in the line to that coil. This will be necessary when the controller is started up, and may also be necessary at other times.

Assume that the process variable has fallen below the low limit which has been set for it. This will cause the Low limit switch $S_L$ to close. Relay R-2 will then be energized by current flowing through the No. 2 contacts of R-5, and then through the timer switch $T_3$. After energizing, R-2 will be held in through the No. 2 contacts of R-5 and its own No. 1 contacts.

Furthermore, when R-2 is energized, current will then flow through the timer switch $T_3$, and through the No. 2 contacts of relay R-2 to energize relay R-1.

When relay R-1 is energized, it will be held in by current flowing through the No. 2 contacts of relay R-5 and its own No. 1 contacts. Current will also flow through the No. 2 contacts of R-1 to operate the pulser unit 30, and through the No. 3 contacts of R-1 to energize relay R-6.

When relay R-6 has been energized, power is supplied through its No. 2 contacts to the timer T. R-6 also has a holding circuit, by way of the timer $T_2$ switch and its own No. 1 contacts. This holding circuit will be maintained until the timer enters the "interval" phase and the timer $T_2$ switch moves to the O position. From this point on to the end of the cycle, however, the timer gets power through its own $T_2$ switch. Consequently, R-6 can be de-energized without disrupting the overall operation.

When R-1 and R-6 are energized, they provide power to operate the pulser unit 30 and the timer T, respectively. The pulser and the timer begin to operate almost simultaneously. Since they operate practically independently of each other, however, they will be described separately in the explanation of the electrical circuit.

Power is applied to the timer through the No. 2 contacts of relay R-6, when R-6 becomes energized. After energizing, R-6 is held in by current flowing through the timer $T_2$ switch (at that moment in the C position), and through R-6's own No. 1 contacts. The sequence of events, when power goes on the timer, is then as follows:

(1) The timer begins to drive downscale through its reverse motor (RM).

(2) Approximately 1 second later, the timer $T_1$ switch reverses, and the timer begins to drive upscale through its foreward motor (FM).

(3) Approximately 2 seconds after the timer starts, the timer switches $T_2$ and $T_3$ switch to their 0 contacts. When $T_2$ switch changes over, the holding circuit to relay R-6 is broken. R-6 can then be de-energized at such time as relay R-1 is de-energized. It should be noted, however, that if R-1 were to be de-energized prior to this time, then R-6 would be prevented from dropping out, and consequently from cutting the power off from the timer, by the holding circuit. When the $T_2$ switch changes to the O position, power then comes directly to the timer from $L_1$ through the $T_2$ timer switch, independent of relay R-6.

When the timer $T_3$ switch changes, power is shut off from the Low limit and High limit switches, and also from the solenoid of relay R-1, by way of the No. 2 contacts of relay R-2. Relays R-1 and R-2 remain energized, however, by nature of their holding circuits.

(4) After one half of the set interval has elapsed, the timer $T_1$ switch reverses to cause the timer to drive back downscale through the reverse motor (RM).

(5) When the complete interval has elapsed, and the timer has driven back to zero, timer switches $T_2$ and $T_3$ switch back to the C position. By this time, however, the output stepping operation will be completed and all relays except R-5 will be de-energized. When the timer $T_2$ switch switches to its C contact, power is cut off from the timer, causing it to stop. Power is also cut off from the holding circuit of relay R-5, causing R-5 to drop out.

In a general way, the overall operation consists of a step change in output, the magnitude of which depends upon the number of pulses sent to the Raise or Lower solenoid A or S of the Add-Subtract relay 18, followed by a period of waiting, which depends upon the setting of the timer. This period of waiting is incorporated into the operation to give the step change in output time to have its complete effect on the process. If the step change is effective prior to the expiration of the waiting period, the controlled variable, i.e. the level is accumulator 1, FIGURE 1, will migrate back into the safe zone and the Low limit switch $S_L$ will open. Under these circumstances, timer switch $T_3$ will be able to switch back to its C contact without putting the step controller into action once again.

If, on the other hand, the controlled variable does not return to within its safe limits despite the step change and the waiting interval, so that the Low limit switch $S_L$ is still closed, then when the timer $T_3$ switch switches over to its C contact, relay R-2 will be energized and the output stepping operation, followed by the waiting interval, will be repeated. The step controller will in fact go on making step changes in output, of the set size, followed each time by the waiting interval, until the controlled variable is once more inside of the safe limits.

At the same time as the timer begins to operate, the pulser 30 starts to send out electrical pulses to bring about the step change in output. As these pulses come from the pulser unit, they are fed to the solenoid of relay R-4. This causes R-4 to open and close its contacts in time with the electrical pulses. When the first electrical pulse arrives, R-4 is energized and current flows through the No. 2 contacts of R-5, and the No. 2 contacts of R-4, to the Advance coil AC of the stepping relay 23. Current also flows to the Lower coil S of the Add-Subtract relay 18 through the No. 3 contacts of R-2 and the closed contacts of the push button $P_L$. The fact that the No. 1 contacts of relay R-4 also close is not important at this stage of the operation, except for the consideration that during the pulse interval, when R-4 is energized, the power is cut off from the moving contact 21 of the stepping relay 23. This prevents the Advance coil AC and the Reset coil RC from both being energized at the same time, and assures that the stepping relay will function properly.

When the electrical pulse is fed to the Advance coil AC of the stepping relay, the moving contact is stepped to the first position. Since the step Count switch 25 is not set at its first position, assuming the setting of FIGURE 2, nothing is caused to happen.

The pulser unit continues to operate and sends a second pulse which causes relay R-4 to close its contacts a second time. This causes a second pulse to be sent to the Advance coil A of the stepping relay and to the Lower coil S of the Add-Subtract relay. When the stepping relay receives its second pulse, the moving contact steps to the second position. Since the second contact of the step count switch is open, however, again nothing will happen.

A third pulse is then sent by the pulser unit to relay R-4, which causes a third pulse to be sent to the Advance coil of the stepping relay and to the Lower coil of the Add-Subtract relay. When the stepping relay receives this third pulse, its moving contact advances to the third position.

Since the Step Count switch has been set in the third position in the example shown, the electrical current will then flow from the No. 1 contacts of R-4 through the moving contact of the stepping relay, through the Step Count switch to the solenoid of relay R-5. As the No. 2 contacts of R-5 change over to the energized position the circuit to the Lower coil S of the Add-Subtract relay and to the Advance coil of the stepping relay is broken. Consequently, there can be no more pulses sent to these coils at this time. The number of pulses has been limited to three, as determined by the setting of the Step Count switch. The holding circuit for relays R-1 and R-2, which was being maintained through the No. 2 contacts of R-5, is also broken, and R-1 and R-2 are de-energized.

In addition, when relay R-5 is energized, current flows through its No. 2 contacts to the Reset coil RC of the stepping relay, causing the moving contact of the stepping relay to return to its home and open position.

The No. 1 contacts of relay R-5 are used to hold relay R-5 in after the moving contact of the stepping relay has dropped back to the home position. This self holding circuit is maintained as long as there is power being supplied to the timer T.

Relay R-4 will remain energized until the pulser unit has driven around to the point where its contacts open. This will cut the power from R-4, and from the pulser unit itself.

Finally, when the timer completes the waiting interval and times out to zero, the holding circuit for relay R-5 will be broken as timer switch $T_2$ switches back to its C contact. The step change in output, and the waiting interval, are now accomplished.

It will of course be understood that the invention described above may be varied and modified in various ways. For example, the flow of material into the accumulator 1 may be monitored, rather than or in addition to the flow outwardly. Where flow outwardly is substantialy influenced by the hydraulic head or level in the accumulator, this may be kept more nearly constant by adjustment of the inflow rate.

Various equivalents and modifications of the several elements of equipment will suggest themselves to those skilled in the art and it is intended to cover these, within the scope of the following claims, and within the proper limitations of the prior art.

What is claimed is:

1. Apparatus for maintaining control over the flow of liquid material to a process, comprising an accumulator for said material; high and low level detecting means for sensing undesirable increase or decrease of the quantity of said material in the accumulator; a flow control device for constantly monitoring the flow of said material with respect to said accumulator; step controller mechanism for adjusting said flow control device in sequentially timed uniform increments; selective means for predetermining the magnitude of said increments by selecting an increment of suitable magnitude from a plurality of pre-established increments of varying magnitudes and automatic means for operating the step controller repeatedly, when necessary, after a predetermined, adjustable time interval has elapsed, to obtain the desired control or alternatively reversing the operation of the step controller as required for stable operation.

2. Apparatus according to claim 1 wherein a variably adjustable timer is included to control the time interval between successive operations of the step controller.

References Cited in the file of this patent

UNITED STATES PATENTS

| | | |
|---|---|---|
| 1,346,898 | Kingsbury | July 20, 1920 |
| 2,051,180 | Ruzicka | Aug. 18, 1936 |
| 2,204,225 | Merckel | June 11, 1940 |
| 2,310,298 | Kuhl et al. | Feb. 9, 1943 |
| 2,748,330 | Bergen | May 29, 1956 |